2,870,718

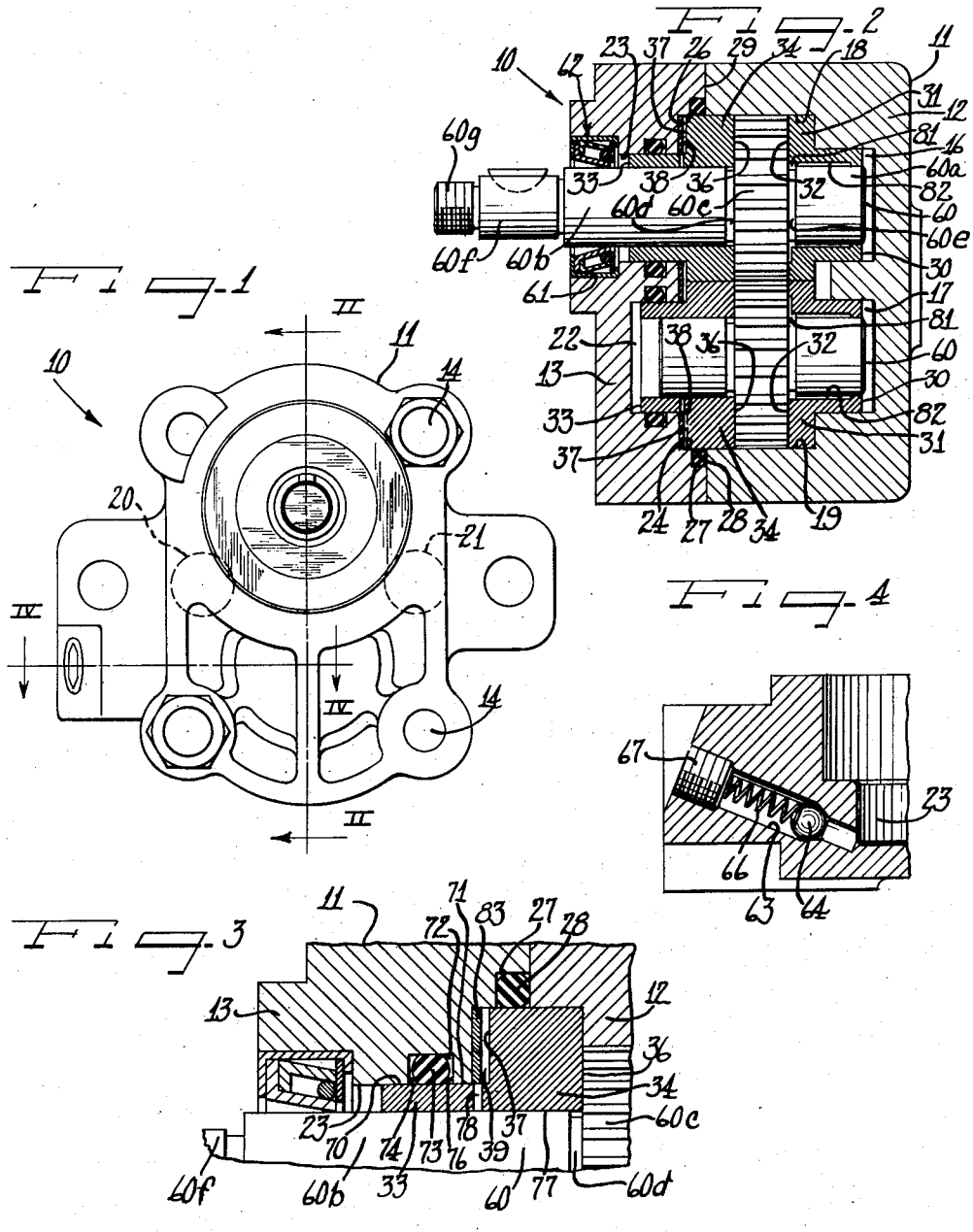

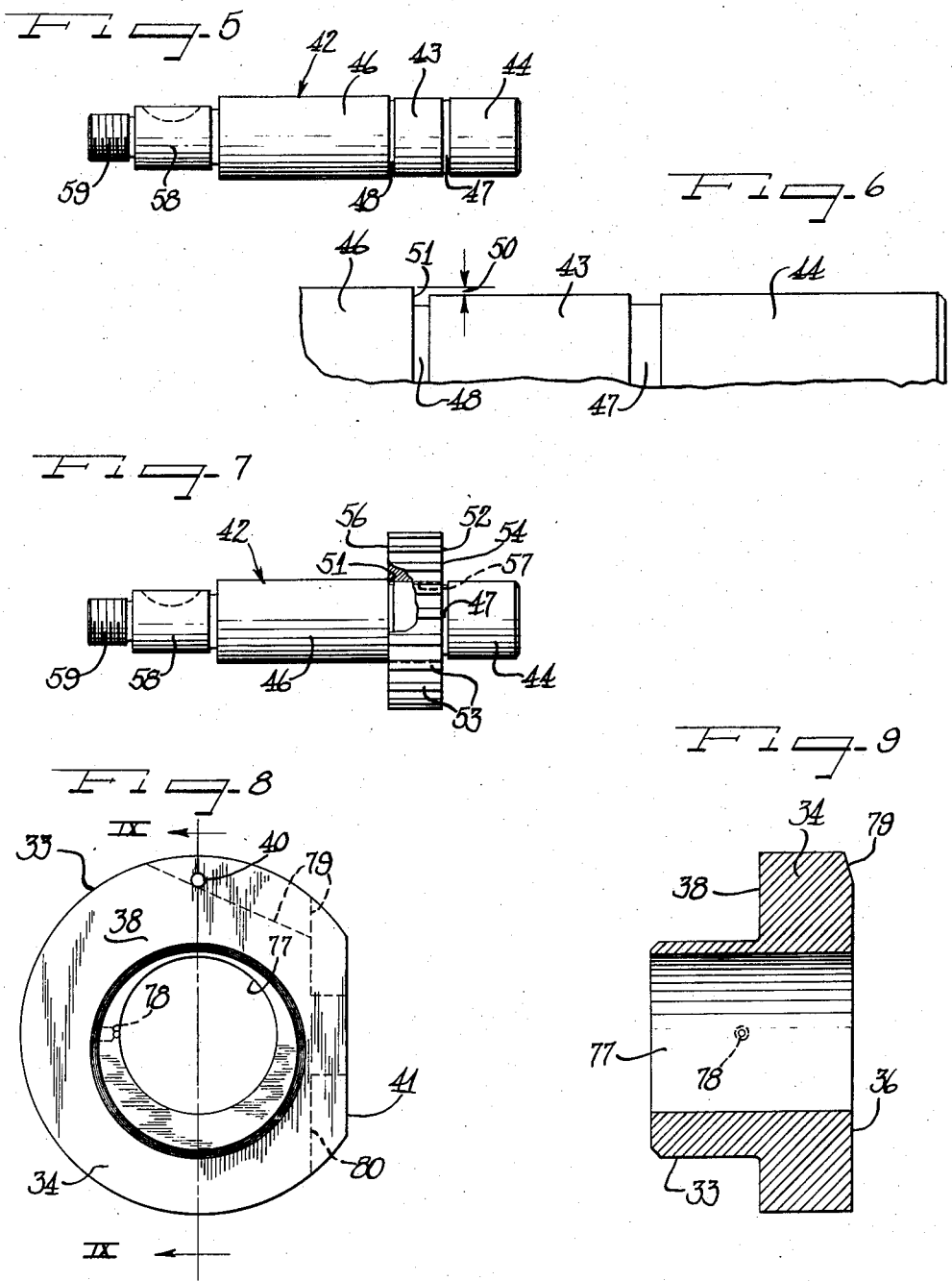

IMPLEMENT PUMP

Herbert F. Prasse, Gates Mills, Ohio, assignor to Thompson Products, Inc., Cleveland, Ohio, a corporation of Ohio Application October 23, 1953, Serial No. 387,826

10 Claims. (Cl. 103—126)

This invention relates generally to positive displacement pumping apparatus and more particularly relates to a pump having intermeshing gear impellers and including movable end plate means loaded against an adjoining side face of a gear by pump generated fluid pressure to provide a seal for the impellers.

Since pressure loaded movable end plate means have heretofore been provided for gear pumps, the present disclosure necessarily relates to refinements and improvements designed to improve the operating efficiency of the pump and facilitating the production and manufacture of large numbers of pumps at an economical cost and from a reduced number of simplified components.

According to the general principles of the present invention, a pump is provided comprising a casing having a pumping chamber with an inlet and an outlet. Rotary fluid displacement means in the pumping chamber preferably take the form of intermeshing gear impellers each including a two part gear having a cylindrical shaft part and a gear hub part.

The cylindrical shaft part has a medial portion and end portions on opposite sides thereof, the gear hub part being apertured and being received on the medial portion with opposed side faces extending radially outwardly thereof. One of the end portions of the shaft part is larger in diameter than the aperture in the gear hub part and larger than the diameter of the medial portion of the shaft part so as to provide a shoulder to abut one of the side faces of the gear hub part thereby precluding relative axial movement in one direction between the gear parts.

A movable pressure loaded bushing is provided for each gear impeller and preferably takes the form of a generally tubular bushing providing a journalling surface for the enlarged end portion on each shaft part and having at one end a radially outwardly extending flange providing a sealing face for engaging an adjoining gear side face and a pressure face spaced from an adjoining casing wall to form a pressure chamber. Means are provided to communicate pump generated fluid pressure to the pressure chamber thereby to load the movable bushings against the adjoining gear side faces, the pressure loading producing a relative axial movement with respect to the two part gear in a direction opposite the axial movement precluded by the shaft shoulder.

On the opposite side of the gear hub parts are provided fixed bushings which are received in the casing and which provide sealing faces for engaging the other gear side faces. Each fixed bushing has a bore for a corresponding shaft part as well as a counter bore formed in the sealing face thereof and extending a greater depth than the depth of an annular shaft recess formed in the shaft part and extending radially inwardly of a concentrically adjacent gear side face. By virtue of such provision, the heavy thrust of the pump gear against the stationary and fixed bushings will be relieved so that excessive temperatures will be avoided and lubrication breakdown will be minimized.

To assist in flooding the journalling surface provided between the fixed bushings and the shaft part, one or more axially extending grooves may be formed in the journal surface between the bushing and the shaft part communicating the recess means with the journal surface.

In order to receive the movable pressure loaded bushings, the pump casing is provided with a bore particularly characterized by the provision of a pair of axially spaced apart annular bearing surfaces engaging correspondingly spaced portions of the tubular movable bushings between the pressure chamber and a zone of low pressure maintained in the casing bore adjacent the tubular end of the movable bushings. The casing is further provided with an annular recess formed between the spaced apart bearing surfaces and a sealing ring is retained within the annular recess for engaging the walls of the tubular bushing. Even though the tubular bushing is removed from the pump, the sealing ring will be retained within the recess, thereby greatly facilitating the assembling and servicing of the pump structure.

The axially spaced apart annular bearing surfaces are preferably constructed to afford a sliding clearance with the peripheral bushing surface of less than 0.003 inch, thereby isolating the annular recess from pressure differences existing on opposite sides thereof and providing a simple beam support for the tubular portion of the movable bushings for transmitting journalling forces from the gear shaft to the casing.

In accordance with the principles of the present invention, each of the movable bushings is further provided with a radially extending passageway connecting the pressure chamber with the journal surface, thereby to flood the journal surface with the pressurized pumping fluid and assisting in the cooling and lubrication thereof.

It is an object of the present invention, therefore, to provide a pressure loaded gear pump construction which may be economically fabricated from a reduced number of simplified components.

Another object of the present invention is to provide a sealing arrangement for a pressure loaded gear pump wherein the sealing ring between a movable pressure loaded bushing and the casing will be retained in the casing even though the bushing is removed therefrom.

Another object of the present invention is to provide a movable bushing construction for a pressure loaded gear pump wherein means are provided to communicate pump generated fluid pressure to the bearing and journal surfaces of the pump.

Another object of the present invention is to provide a two part gear construction which will afford the utilization of gear side faces of increased accuracy and efficiency.

Another object of the present invention is to provide a two part gear construction wherein relative axial movement between the parts will be effectively precluded.

Yet another object of the present invention is to provide means for relieving heavy thrust of pump gears against a stationary pressure plate.

Still a further object of the present invention is to provide improved support means between a pump casing and the movable pressure loaded bushing.

A further object of the present invention is to provide improved means for isolating a sealing ring between a movable pressure loaded bushing and a pump casing from pressure differences existing on opposite sides thereof.

Many other features, advantages and additional objects of the present invention will become manifest to those versed in the art upon making reference to the detailed description which follows and the accompanying sheets of drawings in which a preferred structural embodiment of a pressure loaded gear pump incorporating the principles of the present invention is shown by way of illustrative example only.

On the drawings:

Figure 1 is an end elevational view of a pump provided in accordance with the principles of the present invention;

Figure 2 is a cross-sectional view taken substantially on line II—II of Figure 1;

Figure 3 is an enlarged fragmentary cross-sectional view illustrating additional details of construction of the pump shown in Figure 2;

Figure 4 is a fragmentary cross-sectional view taken substantially on line IV—IV of Figure 1;

Figure 5 is an elevational view of a shaft part provided in accordance with the principles of the present invention;

Figure 6 is an enlarged exaggerated fragmentary view illustrating structural characteristics of the shaft part of Figure 5;

Figure 7 is a view similar to Figure 5 but showing a sub-assembly of the two part gear construction including the shaft part of Figure 5 and a gear hub part assembled thereon;

Figure 8 is an end elevational view of a movable pressure loaded bushing provided in accordance with the principles of the present invention; and Figure 9 is a cross-sectional view taken substantially on line IX—IX of Figure 8.

As shown on the drawings:

A pump according to the general principles of the present invention is indicated generally by the reference number 10 and includes a casing 11 including a housing member 12 and a cover member 13 held in firm assembly with one another by a plurality of fasteners indicated at 14.

The housing member 12 is provided with a pair of spaced bores 16 and 17 and is further provided with overlapping counterbores indicated at 18 and 19 respectively and which form a pumping cavity for receiving rotary fluid displacement means. The casing 11 is provided with an inlet 20 and an outlet 21 whereby fluid may be moved from the inlet 20 to the outlet 21 through the pumping cavity provided by the overlapping counterbores 18 and 19 through operation of the rotary fluid displacement means.

The cover member 13 is provided with a bore 22 and a bore 23 spaced from the bore 22 and opening outwardly of the cover member. The cover member is further provided with a pair of overlapping counterbores indicated at 24 and 26 corresponding in size and shape to the counterbores 19 and 18, respectively, and adapted to form extensions thereof when the cover member 13 is assembled on the housing member 12. An additional counterbore 27 is provided in the cover member 13 and receives a sealing member 28 for establishing a seal between the abutting faces 29 of the cover member 13 and the housing member 12 when the parts are assembled together.

A bushing 30 is received in each of the bores 16 and 17 of the housing member 12 and comprises a generally tubular shaped member having a radially outwardly extending flange 31 at one end thereof. The flange 31 provides a rear face for abutting and engaging an adjoining wall of the housing member 12 and a front sealing face 32 for engaging and sealing an adjoining gear side face.

In each respective bore 22 and 23 of the cover member 13 is received a movable generally tubular bushing indicated generally at 33 and each having a flange 34 at one end thereof providing a front sealing face 36 for engaging and sealing an adjoining gear side face and a rear pressure face 37 spaced from an adjoining wall 38 of the cover member to form a pressure chamber 39 (Figure 3). As shown in Figure 8, a passage 40 may be provided through the flange 34 to communicate pump generated fluid pressure to the pressure chamber 39 for acting on the pressure face 37, thereby to pressure load the movable bushings 33. It will also be noted on Figure 8 that each flange 34 is provided with a flat chordal section 41 so that an adjacent pair of flanges 34 will about along the chordal sections 41, thereby providing a complete end closure for the overlapping counterbores forming the pumping chamber of the pump.

The rotary fluid displacement means of the present pump preferably take the form of meshing gears including a two part gear construction advantageously illustrated in Figures 5, 6 and 7 as well as in Figure 2.

First of all, there is provided a generally cylindrical shaft part 42 including a medial portion 43 and end portions 44 and 46 lying on opposite sides of the medial portion 43.

The medial portion 43 and the end portion 44 are separated from one another by an annular recess or groove 47 while the end portion 46 and the medial portion 43 are separated from one another by a groove indicated at 48.

The end portion 44 is preferably of substantially the same diametric diameter as the medial portion 43 or slightly smaller than the medial portion 43.

The end portion 46, on the other hand, is preferably of a larger diametric dimension than the medial portion 43 and in Figure 6 the relative size is shown in exaggerated form, the difference being indicated by the space between the arrows identified at 50. By virtue of such provision, there is provided a shoulder 51 which extends radially outwardly of the peripheral surface of the shaft part 42.

A gear hub part 52 is provided which preferably includes a plurality of circumferentially spaced teeth 53 and opposed side faces indicated at 54 and 56, respectively.

Since the gear hub part 52 is formed as a separate unit of construction, an improved finish can be provided and the side faces 54 and 56 may be lapped and finished to the degree required for high pump performance and low pressure plate wear characteristics.

The gear hub part 52 is provided with a central aperture 57 having an internal diameter sized with respect to the medial portion 43 and the corresponding outside diameter thereof to afford a shrink fit of less than 0.001 inch. It has been determined that shrink fits of more than 0.001 inch caused distortion of the gear teeth and, accordingly, in accordance with the principles of the present invention, the shrink fit between the gear hub part 52 and the medial portion 43 of the shaft part 42 is maintained at less than 0.001 inch to provide adequate driving torque without imparting distortion to the gear teeth 53.

As shown in Figure 7, when the gear hub part 52 is fitted on the shaft part 42, the shoulder 51 engages the side face 56, thereby precluding relative axial movement of the gear hub part 52 with respect to the shaft part 42 in the direction of the end portion 46.

To afford coupling of the driver gear member to a source of motive power, the end portion 46 is somewhat extended and terminates in a key portion 58 having a threaded neck 59 projecting from one side thereof adapted to cooperate with a fastening member. It will be understood that the same structural characteristics can be advantageously employed in the driven gear, in which event, the end portion 46 is of substantially similar axial extent as the end portion 44.

It should be further noted that the form of the invention as applicable to the two part gear construction as shown in Figure 2 is modified from that shown in the subassembly of Figure 7 in that the two part gear of Figure 2 incorporates a driver shaft 60 having an end portion 60a, an end portion 60b and a medial portion receiving a gear hub part 60c in press fitted relation therewith. Shaft recesses are provided and extend radially inwardly of the shaft 60 as at 60d and 60e, which recesses are located between the medial portion and the respective end portions 60a and 60b and adjacent the side faces of the gear hub part 60c.

The driven gear of Figure 2 is indicated by like reference numerals as the driver gear 60 and it will be noted that the only difference between the two gears resides in the provision on the driver gear 60 of a key portion 60f and a threaded neck 60g by means of which the driver gear 60 may be coupled to a source of motive power.

The cover member 13 is counterbored as at 61 and receives a seal assembly indicated generally by the reference numeral 62 to establish a shaft seal with the end portion 60b of the drive shaft 60. The bore 23 is thus closed and may be referenced to a source of low pressure such as the pump inlet as is shown in Figure 4, a valve passage 63 being provided controlled by a ball valve 64 spring biased by a coil spring 66 bottomed at one end against the ball valve 64 and at the other end against an adjustment plug 67 to communicate the bore 23 with the pump inlet. By virtue of such provision, the seal assembly 62 can conveniently comprise a low pressure sealing device. Moreover, the tubular end of the movable bushing 33 will also be exposed to the zone of low pressure existing in the bore 23.

In addition to providing a seal for retaining fluids within the void spaces between the gear teeth, the pressure loaded movable bushings 33 developed the dual function of transmitting journal loads between the gear shafts and the casing. In accordance with the principles of the present invention, an improved support arrangement is provided between the casing and the movable bushings 33.

As will be noted upon making particular reference to Figure 2 and Figure 3, the cover member 13 at the bore 23 is provided with a pair of axially spaced apart annular bearing surfaces indicated at 70 and 71, respectively, which bearing surfaces 70 and 71 engage correspondingly spaced portions of the tubular movable bushing 33 between the pressure chamber 39 and the zone of low pressure established in the bore 23. Clearance between the axially extending portion of the movable bushing 33 and the casing is held to close limits in order to achieve desirable pump performance. In accordance with the principles of the present invention, a sliding clearance between the spaced bearing portions 70 and 71 and the tubular bushing 33 is maintained less than 0.003 inch. There is thus provided a simple beam support for the bushing 33 throughout the range of axial movement of the bushing 33 for transmitting journal loads from the shaft 60 to the casing 11.

It is further contemplated in accordance with the principles of the present invention to provide a radially outwardly extending annular recess 72 in the cover member 13 between the spaced bearing portions 70 and 71. A sealing member 73 is located within the recess 72 and effects a sealing engagement with the bushing 33 and the cover member 13 of the casing 11.

The sealing member 73 conveniently comprises a rubber O ring. Since the sealing member 73 is confined between opposed walls of the recess 72 indicated at 74 and 76 respectively, the sealing member 73 is effectively retained within the cover member 13 even when the movable bushings 33 are removed during disassembly or servicing of the pump 10.

The spaced bearing surfaces 70 and 71 on opposite sides of the recess 72 is of further advantage since there is thus provided a support on both sides of the sealing member 73 which minimizes any tendency of the sealing member 73 to be extruded into the clearance space between the bushing 33 and the cover member 13 under high discharge pressure condition.

In this connection, it will be noted that the spaced bearing surfaces 70 and 71 cooperating with correspondingly spaced portions of the peripheral surface on the tubular bushing 33 serve to isolate the annular recess 72 from the pressure differences existing on opposite sides of the recess 72.

The movable bushings 33 each provide a bearing surface indicated at 77 which engages the end portion 60b of the shaft 60. In accordance with the principles of the present invention, means are provided to effect lubrication and cooling of the surface 77 by the utilization of a radially extending passageway 78 formed in the bushing 33 and extending between the pressure chamber 39 and the bearing surface 77. Thus, pump generated pressure fluid from the pressure chamber 39 will be conducted through the passage 78 to the bearing surface 77 whereupon the fluid by capillary action can move along the bearing surface 77 toward opposite ends of the bushing in order to assist in cooling and lubricating the bearing surface 77.

As will be particularly noted upon referring to Figures 8 and 9, the bearing surface 77 is concentrically aligned relative to the axis of the shaft 60 and the outer perimeter of the flange 34 whereas the peripheral surface of the tubular bushing 33 between the flange 34 and the outermost end of the bushing 33 is eccentrically offset with respect to the axis of the bushing and the axis of the shaft 60, which offset is toward the inlet side of the pump. By virtue of such provision, the pressure face 38 has an effective pressure area which increases toward the discharge side of the pump to assist in counteracting unequal forces acting against the bushing 33 or the sealing face 36.

It will further be noted that the sealing face 36 is relieved as at 79 to provide a trapping relief at the discharge side of the bushing 33 and is relieved as at 80 to provide a filling relief.

In utilizing the sub-assembly of Figure 7 in a pump, it will be appreciated that the movable bushings 33 are located on the enlarged end portion 46 so that the axial movement of the bushings 33 will be in a direction opposite the direction of movement which is precluded by virtue of the relationship between the shoulder 51 and the side face 56 of the gear hub part 52.

With both forms of gear impellers as shown in Figures 2 and 7, it will be evidenced that a heavy axial thrust will be imparted to the gear impeller and will act against the fixed bushings 30 carried by the housing member 12.

In order to relieve the heavy thrust against the sealing surface 32 in the vicinity of the shaft part of the gear, thereby minimizing developed temperatures and minimizing the possibility of lubrication breakdown, there is provided an annular counterbore 81 in the sealing face 32 of each bushing 30 which extends for a greater depth than the recess 60e in the shaft 60 or the recess 47 in the shaft part 42. By providing such a recess, metal flow of the fixed bushing 30 into either the recess 60e or 47 is precluded.

The fixed bushings 30 are further provided with axially extending grooves 82 which may be one or more in number and which communicate the bearing surfaces between the fixed bushings 30 and the shaft to the recess means adjoining the sealing face 32. Thus, fluid in the recess means will be carried along the journal surface for cooling and lubricating purposes.

To effect initial loading of the movable bushings 33 into sealing relation with the gears, a figure 8-shaped loading spring 83 is provided in the pressure chamber 39, thereby developing an initial biasing force between the movable bushings 33 and the cover member 13 of the casing 11.

Although various minor structural modifications might be suggested by those versed in the art, it should be understood that I wish to embody within the scope of the patent warranted hereon all such modifications as are reasonably and properly within the scope of my contribution to the art.

I claim as my invention:

1. A pump comprising a casing having a pumping chamber with an inlet and an outlet, rotary fluid displacement means in said pumping chamber, and movable end plate means in said casing comprising a generally tubular bushing having a flange at one end providing a front sealing face to engage said rotary fluid displacement means and a rear pressure face spaced from an adjoining wall of said casing to provide a pressure control chamber, said tubular bushing providing a generally cylindrical bore wall forming a bearing surface, means communicating pump generated pressure fluid to said pressure control chamber to load said bushing toward sealing engagement with said rotary fluid displacement means, and a passageway in said bushing extending radially inwardly through said tubular bushing from said pressure control chamber and intersecting said bearing surface between opposite ends of said bushing to supply pressurized fluid for flow in opposite axial directions towards said opposite ends for cooling and lubrication of said bearing surface.

2. In a gear pump, a casing having a bore closed at one end, a tubular bushing in said bore having a flange at one end providing a front sealing face for sealing an adjoining gear side face and a rear pressure face spaced from an adjoining wall of said casing to form a pressure chamber, means communicating pump generated fluid pressure to said pressure chamber to pressure load said bushing, means communicating said bore to pump inlet, said casing having a pair of axially spaced apart annular bearing surfaces with an annular recess therebetween and engaging correspondingly spaced portions of said bushing to isolate said annular recess from the pressure differences on opposite sides thereof and to provide a simple beam support for said bushing, said bushing having a bore extending therethrough providing a bearing surface for a gear shaft, and passage means formed in said bushing to extend radially between said pressure chamber and an intermediate portion of said bearing surface to communicate pressured fluid from said pressure chamber to said bearing surface.

3. In a gear pump, a casing having an end wall formed with a pair of spaced bores and a pair of overlapping counterbores, each respectively coaxial with one of said bores, a tubular bushing stationarily fixed in each bore and each having a flange at one end received in a corresponding one of said counterbores to provide a sealing face for an adjoining gear side face, said overlapping counterbores forming a pumping chamber, said casing having an inlet and an outlet, a two-part gear in each counterbore comprising a gear hub part and a shaft part, each said shaft part having a first portion at one end received in said fixed bushing, a second larger diameter portion at the other end projecting out of said casing, and a medial portion having the gear hub part carried thereon, said second portion providing a shoulder abutted by said gear hub and preventing axial movement of said gear hub on said shaft in one direction, said shaft having a radially inwardly extending recess on each side of said gear hub part separating said medial portion from said first and second end portions, a cover member for said casing having a pair of spaced bores and a pair of overlapping counterbores, each provided respectively for a corresponding one of said bores, a movable tubular bushing in each bore of said cover member for journalling said second larger diameter portions of said shafts in said cover member and each having a flange at one end received in said counterbores to provide a front sealing face for an adjoining gear side face and a rear pressure face spaced from an adjoining wall of said cover member to form a pressure chamber, and means communicating pump generated fluid pressure to said pressure chamber to pressure load said movable bushings toward said gear hub part.

4. In a gear pump, fixed and movable pressure loaded bushings on opposite sides of a pumping cavity, and a two-part gear including a gear hub part and a shaft part, said shaft part having a stepped diameter peripheral surface including a medial portion receiving the gear hub part for rotation in the pumping cavity, a first end portion of larger diameter than said medial portion received in the movable bushing and forming a shoulder abutting said gear hub part preventing relative axial movement between said hub part and said shaft part in one direction, and the opposite end portion received in the fixed bushing.

5. In a gear pump, fixed and movable pressure loaded bushings on opposite sides of a pumping cavity, and a two-part gear rotatable in said pumping cavity and including a gear hub part and a shaft part, said shaft part having a stepped diameter peripheral surface including a medial portion carrying the gear hub part, a first end portion of larger diameter than said medial portion forming a shoulder abutting said gear hub part and preventing movement of said hub part on said shaft in one direction and received in one of said bushings and an opposite end portion received in the other of said bushings.

6. In a gear pump, fixed and movable pressure loaded bushings on opposite sides of a pumping cavity, and a two-part gear rotatable in said pumping cavity including a gear hub part and a shaft part, said shaft part having a stepped diameter peripheral surface including a medial portion carrying the gear hub part, a first end portion of larger diameter than said medial portion forming a shoulder abutting said gear hub part and preventing relative axial movement of said hub part and said shaft part in one direction and received in the movable bushings, the opposite end portion received in the fixed bushings, and an annular groove formed in said shaft between said medial portion and said end portions adjacent the side faces of said gear hub part.

7. In a pump, a casing having a pumping chamber and including an inlet and an outlet, meshing gears in said chamber including a two-part gear having a shaft part and a gear hub part, said gear hub part having a central aperture formed therein, said shaft part received in said aperture and extending through said gear hub part but having a cylindrical portion at one end thereof of larger size than said aperture forming a shoulder abutting against one side of said gear hub part and preventing axial movement thereof in one direction, the other end of said shaft projecting through the other end of said gear hub part and being received in said casing for journalling one side of said gear, a movable bushing between said cylindrical portion of said shaft and said casing having a front sealing face engaging the adjoining gear side face and a rear pressure face spaced from an adjoining casing wall to form a pressure chamber, and means communicating the pump generated fluid pressure to said chamber to load said movable bushing against said gear in the direction of the smaller size portion of the shaft part.

8. A pump comprising a casing having a pumping chamber with an inlet and an outlet, meshing gear impellers in said pumping chamber including a two-part gear impeller for a gear pump comprising a cylindrical shaft part having a medial portion and end portions on opposite sides of said medial portion, and an apertured gear hub part on said medial portion and having opposed side faces extending radially outwardly of said shaft part, one of said end portions being larger in diameter than the aperture in said gear hub part and forming a shoulder abutting one of said side faces and precluding relative axial movement in one direction between the gear hub and shaft parts, and a movable pressure loaded bushing on each of said enlarged end portions loaded against an adjacent gear side face for axial movement relative to said two-part gear in an opposite direction.

9. A pump comprising a casing having a pumping chamber with an inlet and an outlet, meshing gear impellers in said pumping chamber including a two-part gear impeller for a gear pump comprising a cylindrical shaft part having a medial portion and end portions on opposite sides of said medial portion, and an apertured gear hub part on said medial portion and having opposed side faces extending radially outwardly of said shaft part, one of said end portions being larger in diameter than the aperture in said gear hub part and forming a shoulder abutting one of said side faces and precluding relative axial movement in one direction between the gear hub and shaft parts, and a movable pressure loaded bushing on each of said enlarged end portions loaded against an adjacent gear side face for axial movement relative to said two-part gear in an opposite direction, said shaft having an annular recess extending radially inwardly of the other of said gear side faces, and fixed bushings in said casing providing sealing faces engaging said other gear side faces, said fixed bushings each having a bore for a corresponding shaft part and a counterbore in the sealing face of a greater depth than said annular shaft recess to relieve thrust against the stationary sealing faces.

10. A movable bushing for a pressure loaded gear pump comprising a generally tubular bushing having a flange at one end providing a front sealing face adapted to engage an adjoining gear side face, and a rear pressure face adapted to be spaced from an adjoining casing wall to provide a pressure chamber, said tubular bushing providing a generally cylindrical bore wall forming a bearing surface adapted to cooperate with a gear shaft, said bushing having passage means extending through said flange to communicate pump chamber generated pressure behind said pressure face, said bushing having a radially extending passageway intersecting said bearing surface between opposite ends of said bushing and intersecting the outer peripheral surface of said tubular bushing immediately adjacent said pressure face on said flange for communicating pressure fluid to said bearing surface for cooling and lubrication of said bearing surface.

References Cited in the file of this patent

UNITED STATES PATENTS

| | | |
|---|---|---|
| 1,379,587 | Fisher | May 24, 1921 |
| 1,626,115 | Egersdorfer | Apr. 26, 1927 |
| 2,406,964 | Orr | Sept. 3, 1946 |
| 2,479,077 | McAlvay | Aug. 16, 1949 |
| 2,571,377 | Olah | Oct. 16, 1951 |
| 2,633,807 | Collura | Apr. 7, 1953 |
| 2,676,548 | Lauck | Apr. 27, 1954 |
| 2,702,509 | Garnier | Feb. 22, 1955 |
| 2,735,372 | Booth et al. | Feb. 21, 1956 |

FOREIGN PATENTS

| | | |
|---|---|---|
| 498,401 | Belgium | Oct. 14, 1950 |
| 659,600 | Great Britain | Oct. 24, 1951 |
| 1,024,380 | France | Jan. 10, 1953 |